(12) United States Patent
Asagiri et al.

(10) Patent No.: US 6,354,529 B1
(45) Date of Patent: Mar. 12, 2002

(54) WEBBING TAKE-UP DEVICE

(75) Inventors: Katsuki Asagiri; Kenji Hoshino, both of Aichi-ken (JP)

(73) Assignee: Kabushiki Kaisha Tokai-Rika-Denki-Seisakusho (JP)

( * ) Notice: Subject to any disclaimer, the term of this patent is extended or adjusted under 35 U.S.C. 154(b) by 0 days.

(21) Appl. No.: 09/531,006

(22) Filed: Mar. 20, 2000

(30) Foreign Application Priority Data

Apr. 16, 1999 (JP) .......................................... 11-109681

(51) Int. Cl.[7] .............................................. B65H 75/48
(52) U.S. Cl. ..................... 242/379; 242/379.1; 280/807; 297/475
(58) Field of Search .............................. 242/379, 379.1, 242/807; 297/475, 476, 477, 478, 479, 480

(56) References Cited

U.S. PATENT DOCUMENTS

| | | | | |
|---|---|---|---|---|
| 4,671,419 A | * | 6/1987 | Beverly | 211/105.1 |
| 5,526,996 A | * | 6/1996 | Ebner et al. | 242/374 |
| 5,788,176 A | * | 8/1998 | Ebner et al. | 242/374 |
| 6,029,924 A | * | 2/2000 | Ono et al. | 242/379.1 |

FOREIGN PATENT DOCUMENTS

| | | | |
|---|---|---|---|
| JP | 9-286302 | * | 11/1997 |
| JP | 10-71930 | * | 3/1998 |
| JP | 10-86790 | * | 4/1998 |
| JP | 10-287206 | | 10/1998 |
| JP | 11-105671 | * | 4/1999 |

* cited by examiner

*Primary Examiner*—Donald P Walsh
*Assistant Examiner*—David A Jones
(74) *Attorney, Agent, or Firm*—Nixon Peabody LLP; Thomas W. Cole

(57) ABSTRACT

A webbing take-up device for taking up and unwinding a webbing belt in a vehicle is provided that includes a rotatably mounted take-up shaft adapted for receiving and anchoring an end of the webbing belt, and rotatably urged in a direction for taking up the webbing belt; and a frame having a pair of leg plates opposing each other between which the take-up shaft extends. The frame further includes a connecting portion integrally extending from one leg plate to the other, and a fixing portion adapted for fastening to the vehicle, the connecting portion has a plurality of engraved portions on either side defined therein, and at least some of the engraved portions are formed as elongated holes or thinned portions having a longitudinal axis formed substantially along a direction in which tensile force is applied via the take-up shaft and leg plates when the webbing belt is unwound.

18 Claims, 3 Drawing Sheets

WEBBING TAKE-UP DEVICE

BACKGROUND OF THE INVENTION

1. Field of the Invention

The present invention relates to a webbing take-up device for a seat belt apparatus for restraining a vehicle occupant by means of a webbing belt.

2. Description of the Related Art

In a webbing take-up device, which is a principal portion of a seat belt apparatus which restrains a vehicle occupant by means of an elongated belt-shaped webbing belt, there is provided a take-up shaft to which one longitudinal direction end portion of the webbing belt is anchored. The take-up shaft is urged by an urging means such as a spiral coil spring in a direction in which the webbing belt is taken up. When the webbing belt which has been taken up on the take-up shaft is pulled out, the urging force from the urging means acts on the webbing belt. The urging force works as a restraining force which restrains the body of a vehicle occupant in the state in which the webbing belt is applied to the vehicle occupant.

The take-up shaft is supported either directly by a pair of leg plates which are formed at a frame, or indirectly via supporting members which are provided at the leg plates. Each of the leg plates is usually formed in a plate shape. In the case where the leg plates support the take-up shaft directly, the take-up shaft is supported by the leg plates in a manner in which the take-up shaft penetrates the leg plates at supporting holes or the like which are formed at the transverse direction central portion of the leg plates. On the other hand, in the case where the leg plates support the take-up shaft indirectly, the take-up shaft is supported by the leg plates in a manner in which the take-up shaft penetrates through through-holes which are formed at the transverse direction central portion of the leg plates, and is supported by supporting members attached to the leg plates.

One transverse direction end portion of each leg plate is integrally connected to a transverse end portion of a plate-shaped connecting portion. The webbing take-up device is mounted to a vehicle by fixing a portion of the connecting portion to a predetermined region of the vehicle by a fastening means such as a bolt.

When considering the fuel consumption and the like of a vehicle, it is preferable that the structural components of a webbing take-up device be as light as possible. One means for lightening the structural components of a webbing take-up device is lightening the aforementioned frame. Since the connecting portion of the frame is in a plate shape as described above, lightening of the frame can be readily attained by engraving the connecting portion to form appropriate holes or thinned portions.

On the other hand, when the webbing belt is pulled out, tensile force is applied to the connecting portion via the take-up shaft, the leg plates and the like. While the take-up shaft is provided corresponding to the transverse direction central portions of the leg plates as described above, the connecting portion is provided at respective ones of the transverse direction ends of the leg plates. Thus, when the webbing belt is pulled out, a torque about the portion of the connecting portion that is fixed to the vehicle is generated, which will deform the connecting portion in the direction of the torque. From the viewpoint of ensuring and maintaining the restraining force of the webbing belt, it is preferable that the connecting portion deforms as little as possible when acted on by the aforementioned tensile force.

However, random engraving of the connecting portion in order to lighten the same will considerably lower the rigidity of the connecting portion with respect to the aforementioned tensile force, and the connecting portion will be elastically deformed in the direction of the torque when acted on by the aforementioned tensile force.

SUMMARY OF THE INVENTION

In view of the aforementioned, an object of the present invention is to provide a webbing take-up device equipped with a frame which ensures sufficient rigidity and is lightweight.

A first aspect of the present invention is a webbing take-up device for taking-up and unwinding a webbing belt in a vehicle, the webbing belt having an end, wherein the belt is for fastening around a vehicle occupant, the device comprising a rotatably mounted take-up shaft adapted for receiving and anchoring an end of the webbing belt, and rotatably urged in a direction for taking-up the webbing belt and a frame having a pair of leg plates opposing each other between which the take-up shaft extends, a connecting portion integrally extending from one leg plate to the other, and a fixing portion adapted for fastening to the vehicle, the connecting portion having a plurality of apertures defined therein, at least some of the apertures formed as an elongated hole having a longitudinal axis formed substantially along a direction in which tensile force is applied via the take-up shaft and leg plates when the webbing belt is unwound.

In the webbing take-up device which is structured as described above, the take-up shaft, which is supported directly or indirectly by the leg plates of the frame, is urged in the direction in which the webbing belt, whose one end portion is engaged with the take-up shaft, is taken up. When a webbing belt which has been pulled out from the take-up shaft is applied to a vehicle occupant, the body of the vehicle occupant is restrained by the webbing belt which is urged by the urging force in the direction in which the webbing belt is taken up.

In the present webbing take-up device, because engraved portions formed by holes or thinned portions are formed in the connecting portion which connects the pair of leg plates, the connecting portion is lightened by the weight which has been removed by thinning or by the weight corresponding to the volume of the holes.

The engraved portions are formed along the direction in which tensile force acts on the connecting portion via the leg plates when the webbing belt which is taken up on the take-up shaft is pulled out, in the state in which the fixing portion of the connecting portion is fixed to the vehicle body. Furthermore, there are a plurality of engraved portions and these engraved portions are formed parallel to each other along the direction in which the tensile force acts. Therefore, between the engraved portions, there are formed portions that are not thinned portions or holes, whose longitudinal direction is along the direction in which the tensile force acts and whose widths are constant. As a result, the elasticity of the connecting portion against the tensile force is made uniform as compared to a case in which the engraved portions are randomly formed in the connecting portion.

The webbing take-up device of the present invention preferably includes the engraved portions formed continuously or intermittently along the direction from the fixing portion toward the pivotal portions which pivotally support the take-up shaft.

In the webbing take-up device which is structured as described above, the engraved portions are continuously or intermittently formed along the direction from the fixing portion of the connecting portion (that is, the portion at which the frame is fixed to the vehicle body), toward the supporting portion of the take-up shaft. In other words, the tensile force that acts on the take-up shaft when the webbing belt is pulled out acts on the support portions that pivotably support the take-up shaft. On the other hand, since the frame is fixed to the vehicle body at the fixing portion of the connecting portion, the connecting portion resists the tensile force at the fixing portion. Thus, the direction in which the tensile force acts on the connecting portion of the frame is the same as the direction from the fixing portion toward the supporting portion of the take-up shaft. The elasticity of the connecting portion with respect to the tensile force can be made even more uniform by forming the engraved portions continuously or intermittently along this direction, and by forming the regions between the engraved portions to have constant widths and such that the longitudinal directions thereof are along the direction of the tensile force.

The webbing take-up device of the present invention is preferably includes a locking device which locks prevents said take-up shaft from rotating in a direction for unwinding when the vehicle is in a state of rapid deceleration, the locking device including a connective part connecting said take-up shaft to at least one of said pair of leg plates in said state of rapid deceleration, wherein said elongated holes each have a longitudinal axis extending along a direction from said fixing portion toward said connective part.

In the webbing take-up device which is structured as described above, when the vehicle is in a state of rapid deceleration, the locking device connects the take-up shaft to at least one of the pair of leg plates so as to lock the take-up shaft. In this manner, the rotation of the take-up shaft in the pulling-out direction, which is opposite to the take-up direction, is restricted. When the vehicle is in a state of rapid deceleration, because the body of the vehicle occupant begins to move toward the front of the vehicle because of inertia, the webbing belt restraining the body of the vehicle occupant begins to be rapidly pulled out. At this time, the locking device locks the take-up shaft by connecting the take-up shaft to the leg plate and restricts the pulling-out of the webbing belt by restricting the rotation of the take-up shaft in the direction of pulling out. Thus, the force at the webbing belt for restraining the vehicle occupant is increased.

At this time, however, the excessive tensile force which pulls out the webbing belt when the body of the vehicle occupant begins to move toward the front of the vehicle due to inertia acts on the at least one leg plate that is connected to the take-up shaft by the locking device, and acts on the connecting portion via the leg plate or leg plates.

At this time, at least a portion of the tensile force acting on the connecting portion acts in a direction from the fixing portion of the connecting portion toward a connection portion of the leg plate connected to the take-up shaft via the locking device at the side connected to the take-up shaft by the locking device.

In the present webbing take-up device, the elasticity with respect to the excessive tensile force acting on the connecting portion while the vehicle is in a state of rapid deceleration is uniform because the engraved portions are formed continuously or intermittently along the direction described above, and because the intermediate portions between the engraved portions are formed such that their longitudinal directions are along the direction in which the tensile force acts and their widths are constant.

In the present invention, the direction in which the engraved portions are formed is parallel to a direction from the fixing portion toward the connection portion of the leg plate and the take-up shaft, at the side at which the leg plate is connected to the take-up shaft by the locking device. To clarify, the connection portion between the take-up shaft and the leg plate means, in a structure in which the take-up shaft and the leg plate are directly connected, the portion at which the take-up shaft and the leg plate are connected. However, if the take-up shaft and the leg plate are indirectly connected via a locking member which forms the locking device, the connection portion between the lock member and the take-up shaft is the connection portion between the take-up shaft and the leg plate. Furthermore, in the case where there is only one connection portion of the leg plate and the take-up shaft, the direction in which the engraved portions are formed is simply made parallel to the direction from the fixing portion toward the connection portion of the leg plate and the take-up shaft. In contrast, in the case where there are a plurality of connection portions and the directions from the fixing portion toward each of the connection portions are within a predetermined range of angles, the direction from the fixing portion toward the connection portion means the direction from the fixing portion toward the connection portion at which the tensile force actually acts when the tensile force acts on the leg plate. Furthermore, in the case where the tensile force acts on a plurality of connection portions, the direction from the fixing portion toward the connection portion, for the present invention, means, for example, the direction from the fixing portion toward the center of gravity of a polygon obtained by joining these connection portions.

DESCRIPTION OF THE PREFERRED EMBODIMENTS (Overall Structure of Webbing Take-up Device 10)

Figure 1:
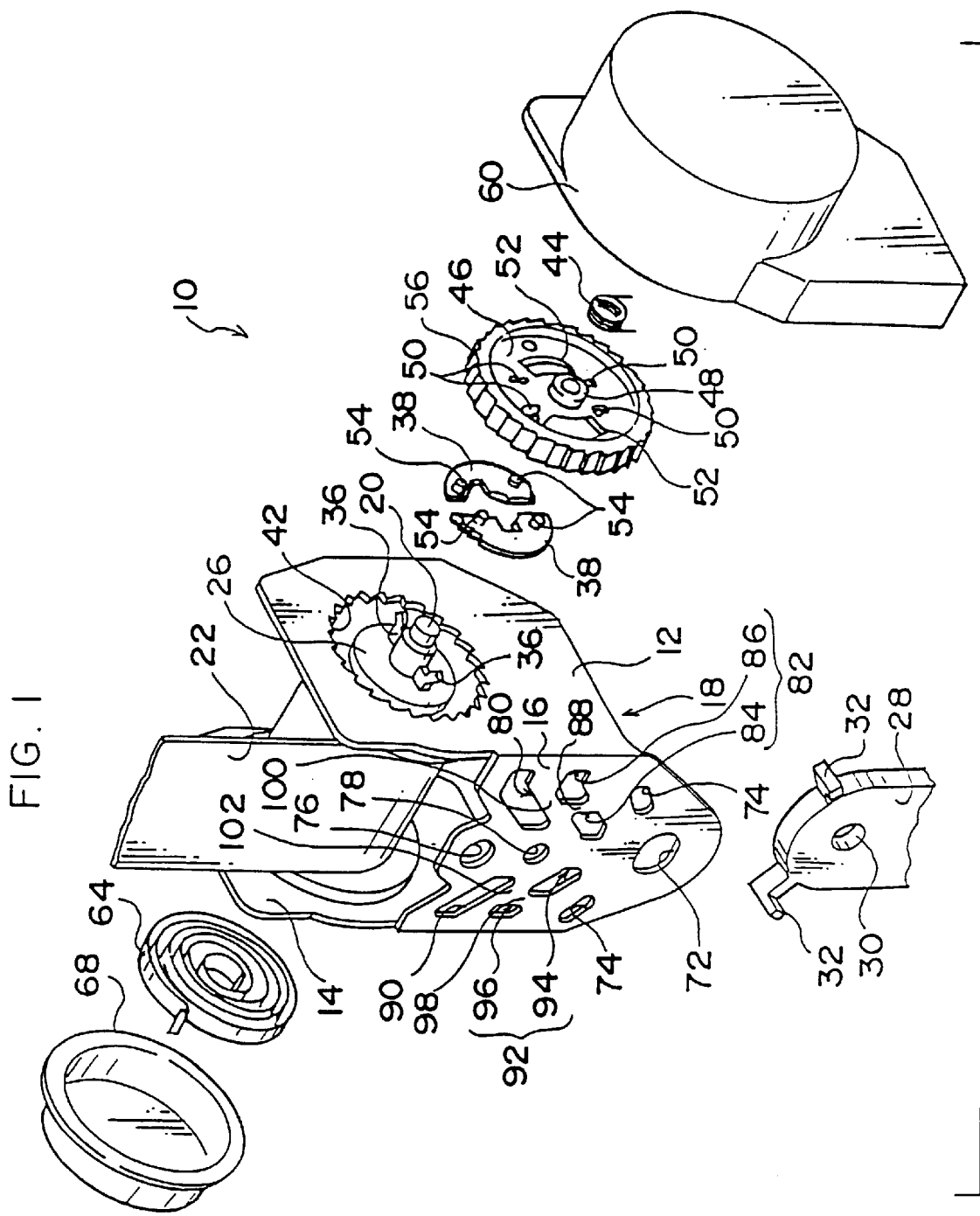
FIG. 1 is an exploded perspective view schematically showing the structure of a webbing take-up device relating to an embodiment of the present invention.

FIG. 1 is an exploded perspective view schematically illustrating the structure of a webbing take-up device 10 relating to an embodiment of the present invention.

As illustrated in FIG. 1, the webbing take-up device 10 includes a frame 18 having a pair of leg plates 12 and 14 which oppose each other along the direction of thickness of the plates, and a connecting portion 16 by which the leg plates 12 and 14 are connected at ones of transverse direction ends thereof. The frame 18 is formed in a substantial U-shape when viewed in plan view. The frame is provided with a spool 20 as a take-up shaft whose axial direction is along the transverse direction of the connecting portion 16. The ends of the spool 20 penetrate the leg plates 12 and 14 to protrude outside the frame 18.

One end portion of a webbing belt 22 for restraining a vehicle occupant, which is formed in an elongated belt shape, is anchored to the spool 20 at the axial direction central portion thereof, between the leg plates 12 and 14. Due to the rotation of the spool 20 in one direction about the axis thereof, the webbing belt 22 is taken up.

A disc-shaped flange portion 26 is formed coaxially with and integrally with the spool 20 near one longitudinal direction end portion of the spool 20. Furthermore, a pair of engaging portions 36 opposing each other across the spool 20 are formed at one end portion of the flange portion 26 in the axial direction thereof. Ratchet teeth are formed at portions of outer peripheries of the engaging portions 36. Lock plates 38 are fitted with play on the ratchet teeth of the engaging portions 36. The lock plates 38, together with a ratchet hole 42 and a V-gear 46 which will be described later, form a locking means.

These lock plates 38 oppose, along the radial direction of the rotation of the spool 20, the internal peripheral portion of the ratchet hole 42 which is formed in the leg plate 12. Ratchet teeth are formed at the internal peripheral portion of the ratchet hole 42 and are able to mesh with the ratchet teeth formed at the external peripheral portions of the lock plates 38. The lock plates 38 are usually disposed such that the external peripheral portions thereof are separated from the internal peripheral portion of the ratchet hole 42. When the lock plates 38 move so as to approach the internal peripheral portion of the ratchet hole 42 and the ratchet teeth of the external peripheral portions mesh with the ratchet teeth of the internal peripheral portion of the ratchet hole 42, the rotation of the lock plates 38, with the rotational center of the spool 20 as an axis of rotation, in the direction of pulling out the webbing belt 22 is limited.

As shown in FIG. 1, the V-gear 46 is coaxially supported at one end portion of the spool 20. A boss 48 of the V-gear 46 and the spool 20 are connected by a torsion coil spring 44, which is attached by an unillustrated resin part such as a cap with a pawl, and the V-gear 46 normally rotates when the spool 20 rotates. Around the boss 48 of the V-gear 46, there are formed four guide holes 50 and apertures 52 into which the engaging portions 36 of the spool 20 are inserted for free movement. A pair of projections 54 standing erect from each lock plate 38 are respectively inserted in these guide holes 50.

At the outer circumference of the V-gear 46, there are formed lock gear teeth 56 which restrict the rotation of the V-gear 46 when the lock gear teeth 54 are engaged with an unillustrated engaging pawl of an acceleration sensor which is provided at the radial direction outer side of the V-gear 46.

The V-gear 46 and the acceleration sensor are accommodated within a cover 60 provided at the side of the leg plate 12. One end portion of the spool 20 in the axial direction thereof is rotatably supported at a bearing portion (not shown) formed at the internal bottom portion of the cover 60.

The cover 60 is made substantially integral with the leg plate 12 by a fastening means such as a screw or a bolt, or by a fitting means like pawls or projections formed on at least one of the leg plate 12 and the cover 60 such that the pawls or the projections are able to fit with the other of the leg plate 12 and the cover 60, or by a joining means such as a fixing means such as an adhesive.

Also, as shown in FIG. 1, a spiral coil spring 64 is provided at the other end of the aforementioned spool 20 (that is, opposite to the end at which the engaging portions 36 are formed). The inner end portion of the spiral coil spring 64 engages with the spool 20, and the external end portion thereof is fixed to a cover 68 provided at the side of the leg plate 14. The spiral coil spring 64 urges the spool 20 in the take-up direction, at least when the webbing belt 22 is pulled out from the spool 20.

The cover 68 is made substantially integral with the leg plate 14 by a fastening means such as a screw or a bolt, or by a fitting means like pawls or projections formed on at least one of the leg plate 14 and the cover 68 such that the pawls or the projections are able to fit with the other of the leg plate 14 and the cover 68, or by a joining means such as a fixing means such as an adhesive.

(Structure of the Connecting Portion 16 of the Frame 18)

Figure 2A:
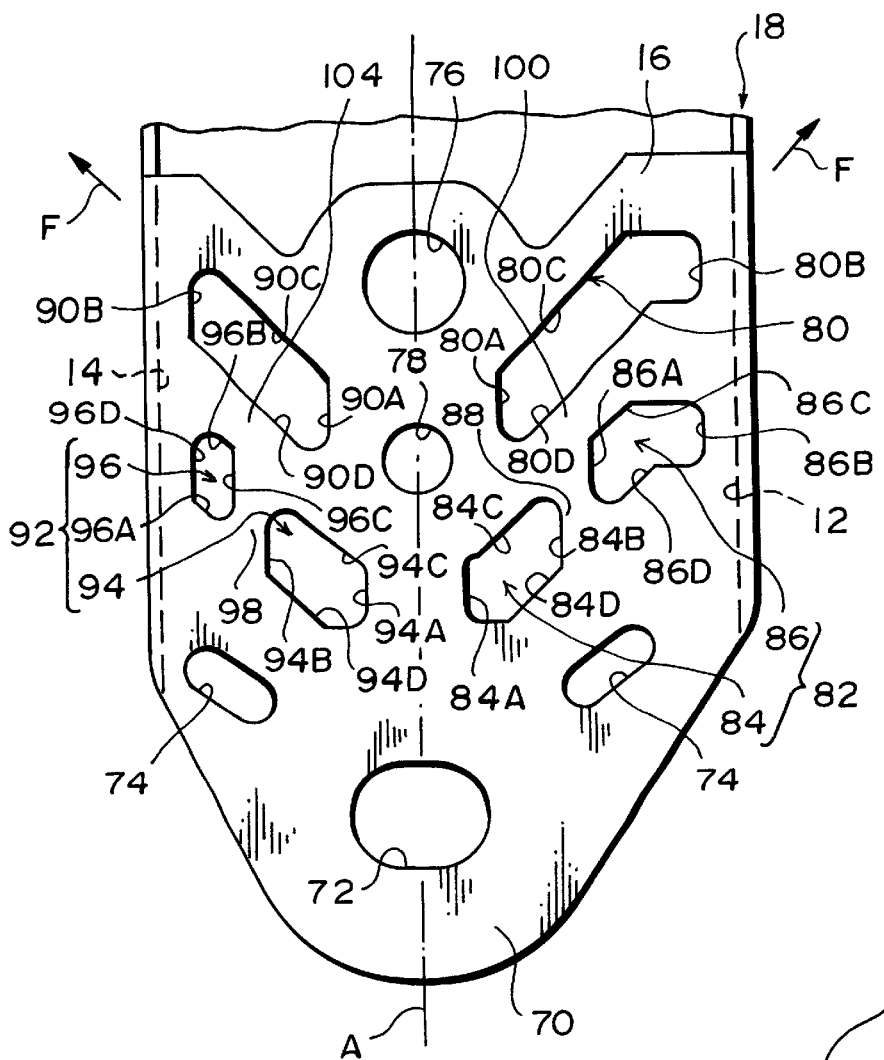
FIG. 2A is a rear view of the connecting portion showing the structure of the engraved portions.

The webbing take-up device 10 of the structure described above is attached to a predetermined position, such as near the lower end portion (not shown) of a center pillar of a vehicle. The front view of the frame 18 is shown in FIG. 2A. As shown in FIG. 2A, a portion of the connecting portion 16 of the frame 18, below the connective parts at which the connecting portion 16 connects the leg plates 12 and 14, is a substantially triangular fixing portion 70 whose width gradually becomes smaller downwardly. A bolt insertion hole 72 is formed in the vicinity of the peak portion (the lower end portion in FIG. 2A) of the fixing portion 70, and penetrates through the connecting portion 16 in the direction of thickness thereof. The bolt insertion hole 72 is an elongated hole whose longitudinal direction is along the transverse direction of the connecting portion 16. A bolt penetrates the bolt insertion hole 72 and penetrates a penetrating hole 30 of a supporting portion 28, which is provided at a vehicle body, and is fastened by means of a nut or the like. Thus, the connecting portion 16 is fixed to the supporting portion 28 such that the webbing take-up device 10 is supported at the vehicle body.

A pair of positioning holes 74 are formed above the insertion hole 72. Each of the positioning holes 74 is an elongated hole whose longitudinal direction is inclined toward the transverse direction from the longitudinal direction (vertical direction) of the connecting portion 16. The positioning holes 74 are formed approximately along the transverse direction ends of the fixing portion 70, and are disposed so as to be inclined obliquely downward in FIG. 2A, such that these positioning holes 74 approach each other toward the peak portion (lower end portion in FIG. 2A) of the fixing portion 70. A pair of pawl portions 32 corresponding to these positioning holes 74 are formed at the supporting portion 28, and the connecting portion 16 is provisionally supported at the supporting portion 28 by fitting these pawl portions 32 in the positioning holes 74. In this way, the connecting portion 16 can be positioned with respect to the supporting portion 28.

These positioning holes 74 can prevent the webbing take-up device 10 for the driver's seat and the webbing take-up device 10 for the front passenger's seat from being assembled at the respective wrong sides of the vehicle, by making the angle between the positioning holes 74 of the webbing take-up device 10 for the driver's seat and the angle between the positioning holes 74 of the webbing take-up device 10 for the front passenger's seat different from each other, and forming the pawls 32 such that the angle between the pawls 32 on the supporting portion 28 for the driver's seat and the angle between the pawls 32 on the supporting portion 28 for the front passenger's seat each match the angle between the corresponding pair of positioning holes 74.

A pilot hole 76, for guiding during a press molding process to form the frame 18, is formed in the vicinity of the top end portion of the connecting portion 16, at the transverse direction central portion thereof. A connector mounting hole 78 is provided below the pilot hole 76. A connector, which is attached to a wire harness trailed close to the present webbing take-up device 10, is fitted in the connector mounting hole 78. Insertion hole 72, pilot hole 76 and mounting hole 78 are all symmetrically aligned along an axis A as shown.

A plurality of engraved portions 80 and 82 are formed at the side of the connector mounting hole 78 toward the leg plate 12. The engraved portion 80 is an elongated hole in which one end portion 80A, which is disposed at the connecting portion 16 transverse direction central portion side of the engraved portion 80, is located lower than another end portion 80B, which is disposed at the connecting portion 16 transverse direction external portion side (that is, the direction toward the leg portion 12) of the engraved portion 80. The longitudinal direction of the engraved portion 80 is along the direction from the end portion 80A toward the end portion 80B and the direction opposite thereto. The direction from the end portion 80A toward the end portion 80B is parallel to the direction from the center of the bolt insertion hole 72 toward the center of the ratchet hole 42 formed at the leg plate 12.

The width dimension of the engraved portion 80 is approximately constant along the longitudinal direction thereof. An end portion 80C and an end portion 80D in the transverse direction of the engraved portion 80 are parallel to each other. However, the end portions 80A and 80B are substantially linear along the vertical direction of the connecting portion 16, and thus are not perpendicular to the longitudinal direction of the engraved portion 80. Therefore, the engraved portion 80 is formed overall as a substantially parallelogram shape.

The other engraved portion 82 is formed below the engraved portion 80. The engraved portion 82 is formed by two through-holes, a substantially rectangular hole 84 and a substantially rectangular hole 86. The substantially rectangular hole 84 is an elongated hole in which one end portion 84A, which is disposed at the connecting portion 16 transverse direction central portion side of the substantially rectangular hole 84, is located lower than another end portion 84B, which is disposed at the connecting portion 16 transverse direction outer side (that is, the direction toward the leg plate 12) of the substantially rectangular hole 84. The longitudinal direction of the substantially rectangular hole 84 is along the direction from the end portion 84A toward the end portion 84B or the direction opposite thereto. The width dimension of the substantially rectangular hole 84 is approximately constant along the longitudinal direction thereof, and the end portions 84C and 84D in the transverse direction of the substantially rectangular hole 84 are parallel to each other. However, the end portions 84A and 84B are substantially linear along the vertical direction of the connecting portion 16, and thus are not perpendicular to the longitudinal direction of the substantially rectangular hole 84. Therefore, the rectangular portion 84 is formed overall as a substantially parallelogram shape.

A substantially rectangular hole 86 is formed above the substantially rectangular hole 84 and toward the leg plate 12. The substantially rectangular hole 86 is an elongated hole in which one end portion 86B in the longitudinal direction of the connecting portion 16 is disposed at the connecting portion 16 transverse direction outer side of and above another end portion 86A. The longitudinal direction of the substantially rectangular hole 86 is along the direction from the end portion 86A toward the end portion 86B or the direction opposite thereto.

Transverse direction end portions 86C and 86D of the substantially rectangular hole 86 are parallel to each other.

The end portion 86C is located along a line extended from the end portion 84C of the aforementioned substantially rectangular hole 84, and the end portion 86D is located along a line extended from the end portion 84D of the aforementioned substantially rectangular hole 84.

A bridge portion 88 is formed between the end portion 86A of the hole 86, which end portion is at the connecting portion 16 transverse direction inner side of the hole 86, and the end portion 84B of the hole 84, which end portion is at the connecting portion 16 transverse direction outer side (that is, toward the leg plate 12) of the hole 84. The bridge portion 88 corresponds to the one of the pair of positioning holes 74 described above that is located comparatively toward the leg plate 12. The bridge portion 88 is disposed above the one end portion of the two longitudinal direction end portions of the positioning hole 74 that is located toward the transverse direction outer side of the connecting portion 16. Since the bridge portion 88 is disposed above the end portion located toward the transverse direction outer side of the connecting portion 16, out of the projections formed at the supporting portion 28, which is inserted in the positioning hole 74 for the purpose of positioning the frame 18, is prevented from being incorrectly inserted in the substantially rectangular hole 84 or the substantially rectangular hole 86.

The engraved portion 82, formed by the substantially rectangular hole 84 and the substantially rectangular hole 86, can be considered as being the substantially rectangular hole 84 and the substantially rectangular hole 86 divided by the bridge portion 88. However, when the engraved portion 82 regarded from a functional point of view, it is better to consider it as being the engraved portion 82 divided by the bridge portion 88. That is, if the bridge portion 88 were not formed in the engraved portion 82 shown in FIG. 2, the engraved portion 82 would be an elongated hole parallel to the engraved portion 80 along the direction from the end portion 84A toward the end portion 86B or the direction opposite thereto, whose longitudinal direction would be parallel to the direction from the center of the bolt insertion hole 72 toward the center of the ratchet hole 42 which is formed at the leg plate 12.

As will be described in detail later, it is preferable that the longitudinal direction of the engraved portion 82 is along the direction in which the tensile force that acts on the connecting portion 16 acts. Therefore, the engraved portion 82 can be formed as a single substantially parallelogram shaped hole without providing the bridge portion 88.

A plurality of engraved portions 90 and 92 are formed at the side of the pilot hole 76 toward the leg plate 14. The engraved portion 90 is an elongated hole in which one end portion 90A, which is disposed at the connecting portion 16 transverse direction central portion side of the engraved portion 90, is located lower than another end portion 90B, which is disposed at the connecting portion 16 transverse direction outer side (that is, the direction toward the leg portion 14) of the engraved portion 90. The longitudinal direction of the engraved portion 90 is along the direction from the end portion 90A toward the end portion 90B or the direction opposite thereto. The direction from the end portion 90A toward the end portion 90B is parallel to the direction from the center of the bolt insertion hole 72 toward the center of the leg plate 14. The width dimension of the engraved portion 90 is approximately constant along the longitudinal direction thereof. The end portions 90C and 90D of the engraved portion 90 in the transverse direction thereof are parallel to each other. However, the end portions 90A and 90B are substantially linear along the vertical direction of the connecting portion 16, and thus are not perpendicular to the longitudinal direction of the engraved portion 90. Therefore, the engraved portion 90 is formed overall as a substantially parallelogram shape.

The other engraved portion 92 is formed below the engraved portion 90. The engraved portion 92 is formed by two through-holes, a substantially rectangular hole 94 and a substantially rectangular hole 96. The substantially rectangular hole 94 is an elongated hole in which one end portion 94A, which is disposed at the connecting portion 16 transverse direction central portion side of the substantially rectangular hole 94, is located lower than another end portion 94B, which is disposed at the connecting portion 16 transverse direction outer side (that is, the direction toward the leg plate 14) of the substantially rectangular hole 94. The longitudinal direction of the substantially rectangular hole 94 is along the direction from the end portion 94A toward the end portion 94B or the direction opposite thereto. The width dimension of the substantially rectangular hole 94 is approximately constant along the longitudinal direction thereof, and the end portions 94C and 94D in the transverse direction of the substantially rectangular hole 94 are parallel to each other. However, the end portions 94A and 94B are substantially linear along the vertical direction of the connecting portion 16, and thus are not perpendicular to the longitudinal direction of the substantially rectangular hole 94.

The substantially rectangular hole 96 is formed above the substantially rectangular hole 94 and toward the leg plate 14. The substantially rectangular hole 96 is an elongated hole with the longitudinal direction thereof being along the vertical direction of the connecting portion 16. An upper end portion 96B and a lower end portion 96A are located along lines extended from the end portions 94C and 94D of the aforementioned substantially rectangular hole 94 respectively. On the other hand, the transverse direction end portions 96C and 96D of the substantially rectangular hole 96 are along the vertical direction of the connecting portion 16, and are parallel to each other. That is, the substantially rectangular hole 96 is formed overall as a substantially parallelogram shape.

A bridge portion 98 is formed between the end portion 96C of the hole 96, which end portion is at the connecting portion 16 transverse direction inner side of the hole 96, and the end portion 94B of the hole 94, which end portion is at the connecting portion 16 transverse direction outer side (that is, toward the leg plate 14) of the hole 94. The bridge portion 98 corresponds to the one of the pair of positioning holes 74 described above that is located comparatively toward the leg plate 14. The bridge portion 98 is disposed above the one end portion of the two longitudinal direction end portions of the positioning hole 74 that is located toward the transverse direction outer side of the connecting portion 16. Since the bridge portion 98 is disposed above the end portion located at the transverse direction outer side of the connecting portion 16, one of the two pawl portions 32 of the supporting portion 28 is prevented from being incorrectly inserted in the substantially rectangular hole 94 or the substantially rectangular hole 96.

The engraved portion 92, formed by the substantially rectangular hole 94 and the substantially rectangular hole 96, can be considered as being the substantially rectangular hole 94 and the substantially rectangular hole 96 divided by the bridge portion 98. However, when the engraved portion 92 is regarded from a functional point of view, it is better to consider it as being the engraved portion 92 divided by the bridge portion 98.

That is, if the bridge portion 98 were not formed in the engraved portion 92 shown in FIG. 2A, the engraved portion 92 would be a substantially parallelogram shaped hole parallel to the engraved portion 90 along the direction from the end portion 94A toward the end portion 96D or the direction opposite thereto, whose longitudinal direction would be parallel to the direction from the center of the bolt insertion hole 72 toward the center of the ratchet hole 42 which is formed at the leg plate 12.

Figure 2B:
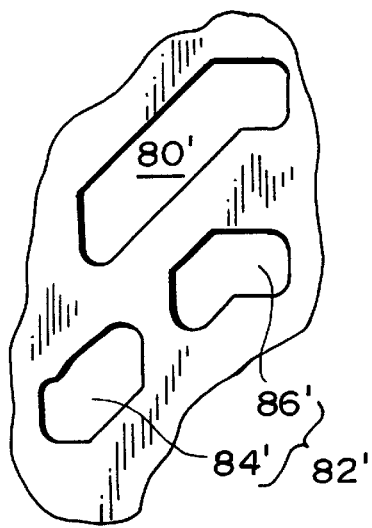
FIG. 2B is a partial section of the connecting portion of FIG. 2A wherein the apertures forming an engraved portion have been replaced with thinned portions.

As is shown in FIG. 2B, the holes 80, 84, and 86 forming the engraved portions 80 and 82 may also be formed from thinned portions 80', 84', and 86' in the connecting portion 16 of the frame 18. Although not specifically shown in FIG. 2B, the engraved portions 90 and 92 on the other side of the connecting portion 16 may also be formed from thinned portions in the frame 18. The thinned portions may be made in the same shape as the illustrated holes.

As will be described in detail later, from the point of view of the first aspect of the present invention, it is preferable that the longitudinal direction of the engraved portion 92 is along the direction in which the tensile force that acts on the connecting portion 16 acts. Therefore, the engraved portion 92 can be formed as a single substantially parallelogram shaped hole, without providing the bridge portion 98.

(Operation and Effects of the Present Embodiment)

The operation and effects of the present embodiment will be described hereinafter.

The present webbing take-up device 10 is attached to the predetermined position of a vehicle by fastening a bolt, which penetrates the bolt insertion hole 72 of the connecting portion 16 and then penetrates the supporting portion 28, by means of a nut or the like. As described above, in the present webbing take-up device 10, due to the formation of the engraved portions 80 and 82 (that is, the substantially rectangular hole 84 and the substantially rectangular hole 86) and 90 and 92 (that is, the substantially rectangular hole 94 and the substantially rectangular hole 96), the weight of the connecting portion 16 is lightened by an amount corresponding to the volume of the engraved portions 80, 82, 90 and 92, as compared to the case in which the connecting portion is formed without forming these engraved portions 80, 82, 90 and 92. In this way, the weight of the frame 18 and thus the weight of the webbing take-up device 10 lightened, which enables, for example, improvement of specifications such as the fuel consumption of a vehicle. Further, the aforementioned engraved portions 80, 82, 90 and 92 can be formed easily by so-called punching during forming of the frame 18, and moreover, during the punching process for punching the outline of the frame 18. Thus, forming of the engraved portions will not cause an increase in the number of manufacturing processes and the cost.

In the present webbing take-up device 10 which has the effects described above, the vehicle occupant holds an unillustrated tongue plate through which the webbing belt 22 passes, pulls out the webbing belt 22, and engages the tongue plate with an unillustrated buckle device, thereby applying the webbing of a three-point type seat belt device. That is, the portion of the webbing belt 22 between an unillustrated shoulder anchor provided at an upper portion of the center pillar and the tongue plate is the shoulder webbing, and the portion of the webbing belt 22 between the tongue plate and the webbing take-up device is the lap webbing.

At the time of a rapid deceleration of the vehicle while the webbing is applied to the vehicle occupant, the vehicle occupant's body begins to move toward the front of the vehicle due to inertia, and the webbing belt 22 begins to be pulled out. Due to the webbing belt 22 starting to be pulled out, the spool 20 begins to rotate in the direction in which the webbing is pulled out, and the V-gear 46 also begins to rotate along with the rotation of the spool 20. The acceleration sensor which is provided at the radial direction outer side of the V-gear 46 detects the state of rapid deceleration of the vehicle, and limits the rotation of the V-gear 46 by engaging the engaging pawl with the V-gear 46. As a result, the V-gear 46 rotates relative to the spool 20, and each of the lock plates 38 is displaced outwardly along the radial direction of the spool 20, while guided by the guide holes 50. The displacement of each of the lock plates 38 causes the ratchet teeth of the lock plates 38 to mesh with the ratchet teeth formed at the ratchet hole 42 of the leg plate 12. The rotation of the lock plates 38, which rotate together with the spool 20, is limited, and the rotation of the spool 20 in the direction in which the webbing belt 22 is pulled out is limited. Thus, pulling out of the webbing belt 22 is limited, and the restraining force by which the webbing belt restrains the body of the vehicle occupant increases.

Figure 3:
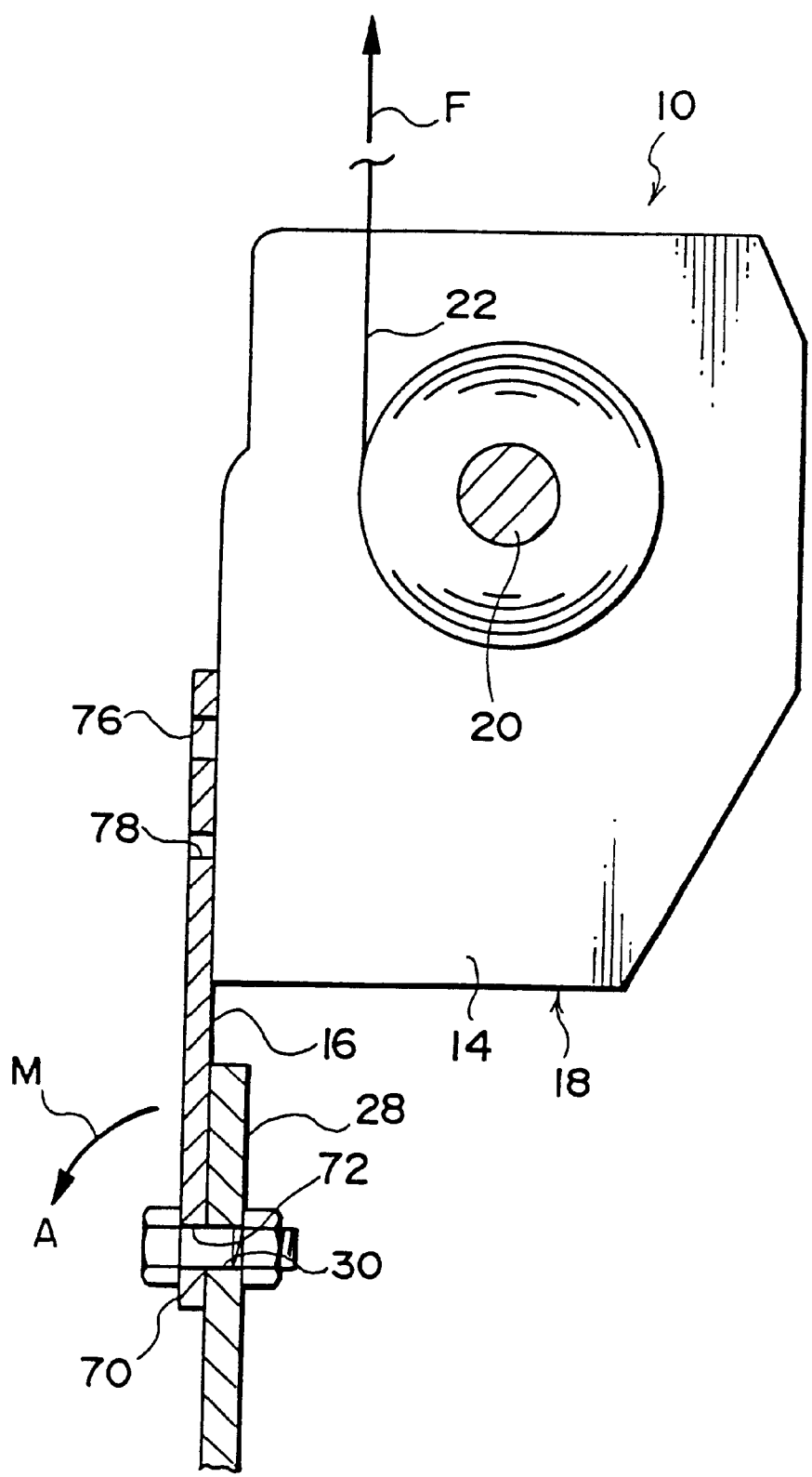
FIG. 3 is a longitudinal sectional view schematically showing the structure of the webbing take-up device relating to the embodiment of the present invention, showing the direction of torque which is generated when a tensile force is applied.

When the body of the vehicle occupant begins to pull out the webbing belt 22 because of inertia at the time of a rapid deceleration of the vehicle, but the rotation of the spool 20 is limited, a tensile force F acts on the spool 20 via the webbing belt 22, and then on the leg plate 12 via the lock plates 38 and on the leg plate 14 via the cover 68, as shown in FIG. 3. At the leg plate 12 side, the spool 20 pulls up the leg plate 12 with the ratchet hole 42 as the center. At the leg plate 14 side, because the spool 20 is connected to the leg plate 14 via the cover 68, the cover 68 pulls up the leg plate 14 with the engaging portion of the cover 68 and the leg plate 14 as the center, or, if there are a plurality of engaging portions, with a portion corresponding to the center of gravity of a polygon formed by connecting the engaging portions as the center. Although the tensile force F thus acts on the leg portions 12 and 14, since the connecting portion 16 is connected to the leg plates 12 and 14 at the transverse direction end portions thereof, when the tensile force F is applied, a torque M is generated in the direction of arrow A in FIG. 3, around the portion of the connecting portion 16 which is fixed to the supporting member 28 (that is, around the bolt insertion hole 72).

As described above, the leg plates 12 and 14 are connected to the connecting portion 16 at the transverse direction both end portions thereof. However, since the connecting portion 16 is fixed to the supporting portion 28 in the vicinity of the lower end portion of the transverse direction central portion of the connecting portion 16, the tensile force F acts on the connecting portion 16 as shown in FIG. 3. That is, the tensile force F acts along a direction from the substantial center of the bolt insertion hole 72, at which the connecting portion 16 is fixed to the supporting portion 28, toward the upper part of the connecting portion 16 and toward the transverse direction outer sides of the connecting portion 16. In more detail, at the leg plate 12 side, the tensile force F acts along a direction from the substantial center of the bolt insertion hole 72 toward the positioning ratchet hole 42, and at the leg plate 14 side, the tensile force F acts along a direction from the substantial center of the bolt insertion hole 72 toward the connection portion of the cover 68 with the leg plate 14, or, if there are a plurality of connection portions, toward the center of gravity of a polygon formed by connecting the connection portions, or toward the central portion of the leg plate 14. The tensile force F and the torque M caused by the tensile force F, which are described above, tend to deform the connecting plate 16.

In the present webbing take-up device 10, the formation of the engraved portions 80, 82, 90 and 92 in the connecting portion 16 as described earlier, inevitably lowers the overall rigidity of the connecting portion 16 relative to the case wherein the engraved portions 80, 82, 90 and 92 are not formed.

Consequently, the end portions 80B and 90B of the engraved portions 80 and 90, which are disposed at the connecting portion 16 transverse direction outer sides of the engraved portions 80 and 90, are located in a higher part of connecting portion 16 than the end portions 80A and 90A which are disposed at the connecting portion 16 transverse direction inner sides. That is, the longitudinal directions of the engraved portions 80 and 90 are along the directions in which the tensile force F acts on the connecting portion 16.

Further, at the engraved portion 82 formed by the substantially rectangular holes 84 and 86, the end portion 84A, which is disposed at the connecting portion 16 transverse direction inner side of the substantially rectangular hole 84 that is disposed comparatively toward the transverse direction inner side of the connecting portion 16, is lower than the end portion 86B, which is disposed at the connecting portion 16 transverse direction outer side of the substantially rectangular hole 86 that is disposed comparatively toward the transverse direction outer side of the connecting portion 16. Further, at the engraved portion 92 formed by the substantially rectangular holes 94 and 96, the end portion 94A, which is disposed at the connecting portion 16 transverse direction inner side of the substantially rectangular hole 94 that is disposed comparatively toward the transverse direction inner side of the connecting portion 16, is lower than the end portion 96D, which is disposed at the connecting portion 16 transverse direction outer side of the substantially rectangular hole 96 that is disposed comparatively toward the transverse direction outer side of the connecting portion 16. Thus, the longitudinal direction of each of the engraved portions 82 and 92 is along the direction in which the tensile force F acts on the connecting portion 16.

As a result, an intermediate portion 100 is formed between the engraved portion 80 and the engraved portion 82. The longitudinal direction of intermediate portion 100 is along the direction in which the tensile force F acts on the connecting portion 16, and the dimension of the space between the transverse direction end portions is generally equal along the longitudinal direction thereof. Also, an intermediate portion 102 is formed between the engraved portion 90 and the engraved portion 92. The longitudinal direction of intermediate portion 102 is along the direction in which the tensile force F acts on the connecting portion 16, and the dimension of the space between the transverse direction end portions is generally equal along the longitudinal direction thereof.

Although the overall stiffness of the connecting portion 16 is thus lowered, the formation of the intermediate portion 102, whose longitudinal direction is along the direction in which the tensile force F acts on the connecting portion 16 and whose dimension of the space between the both transverse direction end portions is generally equal along the longitudinal direction thereof, ensures the strength (rigidity) of the connecting portion 16 against the tensile force F, and also makes the rigidity (or, the elasticity) of the connecting portion 16 against the tensile force F uniform.

Therefore, in the present webbing take-up device 10, deformation of the connecting portion 16 due to the tensile force F and the torque M caused by the tensile force F can be suppressed or prevented, and resultantly, a reduction in the restraining force of the webbing belt 22 due to the deformation of the connecting portion 16 can be suppressed or prevented.

Although substantially rectangular holes 84, 86, 94 and 96 making up the engraved portions 82 and 92, and the engraved portions 80 and 90, are formed as substantially parallelogram shaped elongated holes in the present embodiment, engraved portions, in the broader meaning thereof are not limited to the elongated holes shown in the present embodiment. For example, the engraved portions can be a plurality of small holes, such as circular holes, formed in a plurality of lines along the direction of the tensile force F that acts on the connecting portion 16, and the portions between these rows of small holes can be considered to be intermediate portions. Further, engraved portions, in the broader meaning thereof, need not always be holes penetrating the connecting portion 16 in the direction of thickness thereof, and may be portions at which the thickness of the connection portion 16 is reduced, as is shown in FIG. 2B.

As described above, in the present invention, since the elasticity of the connecting portion along the direction in which the tensile force acts on the connecting portion of the frame when the webbing belt is pulled out is uniform, as compared to the case in which engraved portions are randomly formed at the connecting portion, the amount of elastic deformation of the connecting portion when the tensile force is applied can be made uniform, so the restraining force of the webbing belt can be ensured and maintained. Also, because the weight of the connecting portion can be reduced by the weight of the engraved portions, the weight of the whole device can be reduced.

What is claimed is:

1. A webbing take-up device for taking-up and unwinding a webbing belt in a vehicle, the webbing belt having an end, wherein the belt is for fastening around a vehicle occupant, the device comprising:

a rotatably mounted take-up shaft adapted for receiving and anchoring an end of the webbing belt, and rotatably urged in a direction for taking-up the webbing belt; and a frame having a pair of leg plates opposing each other between which the take-up shaft extends, a connecting portion integrally extending from one leg plate to the other having a middle axis parallel to said opposing leg plates, said connecting portion including a fixing portion at one end having at least one aperture along said axis adapted for fastening to the vehicle, the connecting portion opposite said fixing portion having at least two apertures on either side of said middle axis, each of which is formed as an elongated hole having a longitudinal axis oriented obliquely with respect to said middle axis and substantially along a direction in which tensile force is applied via said take-up shaft and leg plates when said webbing belt is unwound.

2. A webbing take-up device according to claim 1, wherein said frame includes a rotatable portion which supports said take-up shaft, and said elongated holes each have an axis extending along a direction from said fixing portion to said rotatable portion.

3. A webbing take-up device according to claim 1, further comprising a locking device which locks prevents said take-up shaft from rotating in a direction for unwinding when the vehicle is in a state of rapid deceleration, the locking device including a connective part connecting said take-up shaft to at least one of said pair of leg plates in said state of rapid deceleration, wherein said elongated holes each have a longitudinal axis extending along a direction from said fixing portion toward said connective part.

4. A webbing take-up device according to claim 1, wherein said fixing portion includes a positioning member for mounting said fixing portion to the vehicle.

5. A webbing take-up device according to claim 1, wherein said take-up shaft includes a flange which is formed coaxially and integrally with said take-up shaft, and a pair of engaging portions with which said locking device is fitted.

6. A webbing take-up device according to claim 2, further comprising a locking device which locks prevents said take-up shaft from rotating in a direction for unwinding when the vehicle is in a state of rapid deceleration, the locking device including a connective part connecting said take-up shaft to at least one of said pair of leg plates in said state of rapid deceleration, wherein said elongated holes each have a longitudinal axis extending along a direction from said fixing portion toward said connective part.

7. A webbing take-up device according to claim 3, wherein said locking device includes a rotation restricting device.

8. A webbing take-up device according to claim 6, wherein said locking device includes a rotation restricting device.

9. A webbing take-up device according to claim 7, wherein said rotation restricting device includes a rotor, an engaging member for engaging with said rotor, a guide member, and a plate member.

10. A webbing take-up device for taking-up and unwinding a webbing belt in a vehicle, the webbing belt having an end, wherein the belt is for fastening around a vehicle occupant, the device comprising:

a rotatably mounted take-up shaft adapted for receiving and anchoring an end of the webbing belt, and rotatably urged in a direction for taking-up the webbing belt; and a frame having a connecting portion which integrally connects respective ones of transverse direction ends of said pair of leg plates, said connecting portion having a middle axis parallel to said leg plates, and a fixing portion at one end having at least one aperture along said axis for fastening said fixing portion to a vehicle body, said connecting portion being provided with a plurality of engraved portions on either side of axis opposite said fixing portion, each of the engraved portions being formed as a thin portion in said connecting portion, the engraved portions being formed obliquely with respect to said axis and along a direction in which tensile force is applied via said take-up shaft and said pair of leg plates at the time said webbing belt is pulled out, and each of the engraved portions on either side of said axis being formed parallel to each other along the direction in which said tensile force is applied.

11. A webbing take-up device according to claim 10, wherein said engraved portions are formed intermittently along a direction extending from said fixing portion toward a pivotal portion at which said take-up shaft is pivotably supported.

12. A webbing take-up device according to claim 10, further comprising a locking device which locks prevents said take-up shaft from rotating in a direction for unwinding when the vehicle is in a state of rapid deceleration, the locking device including a connective part connecting said take-up shaft to at least one of said pair of leg plates in said state of rapid deceleration, wherein said elongated holes each have a longitudinal axis extending along a direction from said fixing portion toward said connective part.

13. A webbing take-up device according to the claim 10, wherein said fixing portion is provided with a positioning member for mounting said fixing portion to a vehicle.

14. A webbing take-up device according to claim 11, further comprising a locking device which locks prevents said take-up shaft from rotating in a direction for unwinding when the vehicle is in a state of rapid deceleration, the locking device including a connective part connecting said take-up shaft to at least one of said pair of leg plates in said state of rapid deceleration, wherein said elongated holes each have a longitudinal axis extending along a direction from said fixing portion toward said connective part.

15. A webbing take-up device according to claim 12, wherein said take-up shaft includes a flange which is formed coaxially and integrally with said take-up shaft, and a pair of engaging portions with which said locking device is fitted.

16. A webbing take-up device for taking-up and unwinding a webbing belt in a vehicle, the webbing belt having an end, wherein the belt is for fastening around a vehicle occupant, the device comprising:

a frame having a pair of leg plates;

a take-up shaft rotatably mounted between said leg plates of said frame and adapted for receiving and anchoring an end of the webbing belt, and rotatably urged in a direction for taking-up the webbing belt; and means for reducing weight of said frame while maintaining strength against tensile force which is applied via said take-up shaft and said pair of leg plates at the time said webbing belt is pulled out, said means integrally connecting respective ones of transverse direction ends of said pair of leg plates opposing each other, said means having a fixing portion which is fixed to a vehicle body, wherein said means for reducing weight is at least two engraved portions on each side of said means, each of the engraved portions being formed continuously along a direction in which tensile force is applied via said take-up shaft and said pair of leg plates at a time said webbing belt is pulled out, and each of the engraved portion on each side of said means being formed parallel to each other along the direction in which said tensile force is applied.

17. A webbing take-up device according to claim 16, wherein each of the engraved portions is formed as a thin portion in said means and being formed continuously along a direction in which tensile force is applied via said take-up shaft and said pair of leg plates at the time said webbing belt is pulled out, and each of the engraved portions on each side of said means being formed parallel to each other along the direction in which said tensile force is applied.

18. A webbing take-up device according to claim 16, wherein said means for reducing weight being a plurality of engraved portions, each of the engraved portions being formed as a hole and being formed intermittently along a direction in which tensile force is applied via said take-up shaft and said pair of leg plates at the time said webbing belt is pulled out, and each of the engraved portions on each side of said means being formed parallel to each other along the direction in which said tensile force is applied.

* * * * *